Sept. 15, 1959 C. A. WILKINS 2,904,644

VOLTAGE REGULATOR SYSTEM

Filed July 31, 1956

Inventor

Charles A. Wilkins

By L. F. Hammond

Attorney

United States Patent Office 2,904,644

Patented Sept. 15, 1959

2,904,644

VOLTAGE REGULATOR SYSTEM

Charles A. Wilkins, New York, N.Y.

Application July 31, 1956, Serial No. 601,191

6 Claims. (Cl. 179—171)

This invention relates to voltage regulation of amplifier circuits, and more particularly to a voltage regulator system utilized in connection with a power amplifier in a manner to improve and stabilize the performance thereof and to accomplish an increase in fidelity while at the same time protecting the circuit against failure.

It is a primary object of the invention to provide an amplifier circuit wherein the voltages of the system are so regulated as to accomplish uniform linear high fidelity amplification irrespective of wide variations of line voltage. A related object is to provide an amplifier circuit wherein the potential applied to the screen grids of the output tubes will rise or remain constant as the tubes draw greater current with increased signal drive.

A further object of the invention is to provide a regulated amplifier circuit wherein the output tubes are protected against overload in the event of failure of the negative bias supply.

A further object of the invention is to provide an amplifier circuit having an unregulated positive plate supply circuit and an unregulated negative grid bias circuit wherein any hum signals introduced into the output by voltage fluctuations present in either of said circuits is cancelled by imposing a composite signal of opposite phase onto the screen grid of the amplifier tubes.

A still further object of the invention is to achieve the simultaneous accomplishment of all of the foregoing aims and objects by the use of a circuit which is simple in design and construction, and which is applicable to many and varied types of amplifier circuits. In this connection it may be mentioned that while the principles of the present invention are disclosed here in connection with audio power amplification circuits of the push-pull type, yet they are of broader application and may be applied with similar beneficial results to single tube amplifiers, modulators, or to radio frequency circuits.

The foregoing objects are accomplished according to the present teaching by providing an amplifier circuit employing screen grid tubes wherein the positive screen grid voltage supply is precisely controlled by a regulating system influenced both by the potential of the positive plate supply and the negative grid bias supply. By this expedient the voltage applied to the screen grids of the amplifier tubes may be caused to remain entirely constant or even to increase as the tubes pass greater current in response to increase signal potential. Moreover, when the bias supply to the control grids is once adjusted to the desired class of amplification, the tubes will continue to operate in that class irrespective of whether the line voltage is increased, decreased or even caused to fluctuate within wide limits.

While the present invention is applicable to amplifier circuits of various designs, the principles of operation may be most conveniently described in connection with a simplified conventional push-pull audio output stage, and in connection with one variation of the circuit consisting of a successful high fidelity amplifier now in commercial production.

Figure 1:
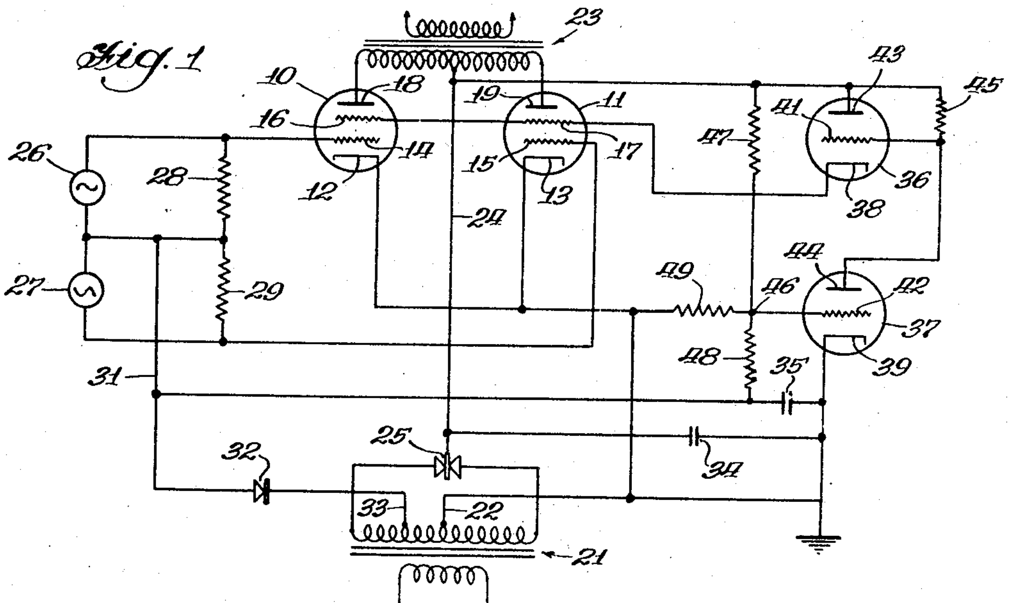
Figure 1 is a schematic diagram of a typical push-pull audio output amplifier constructed in accordance with the present invention.

The circuit of Figure 1 employs a pair of tetrode amplifier tubes 10, 11 each having cathodes 12, 13, control grids 14, 15, screen grids 16, 17, and anodes 18, 19. The cathodes 12, 13 are joined and grounded, and are connected to the center tap 22 of the secondary winding of input power transformer 21. The anodes 18, 19 are connected to the opposite terminals of the primary winding of an audio output transformer 23 as is conventional. The center tap of the winding extends through a B+ plate voltage supply lead 24 to a full wave rectifier 25 interconnecting the opposite end terminals of the secondary winding of the input power transformer 21, to apply operating voltage to the plates of the two tubes. The filament circuits may be conventional and are not shown.

The control grids 14, 15 of the amplifier tubes 10, 11 are fed by a balanced source of input signal, indicated in the diagram as comprising generators 26, 27 directly connected to the grids 14 and 15 respectively. The grids are bridged by a pair of bias resistors 28, 29 and a negative grid voltage is applied to the grids by a voltage supply line 31 connected between the resistors 28 and 29 and the signal sources 26 and 27 and extending through a half wave rectifier 32 to a tap 33 on one side of the center secondary tap 22 of the power input transformer 21. A filter condenser 34 is connected between the B+ supply line 24 and ground, and a filter condenser 35 is connected between the negative bias supply line 31 and ground.

As previously stated, one of the features of novelty of the present invention relates to control of the voltage applied to the screen grids 16 and 17 of the amplifier tubes 10, 11. This is accomplished by a voltage regulator consisting of an output tube 36 and a control tube 37, each shown as being of triode type having cathodes 38, 39 grids 41, 42 and anodes 43, 44. The filament circuits are not shown since they may be conventional. The anode 43 of output tube 36 receives its potential directly from the B+ supply line 24. The anode of the control tube 37 receives its potential from the line 24 through a resistor 45. The control grid of the output tube 36 is connected directly to the anode 44 of the control tube 37, and since tube 36 is arranged to function as a cathode follower, the cathode 38 is connected directly to the screen grids 16, 17 of the power amplifier tubes 10, 11.

The grid 42 of regulator control tube 37 is connected to an intermediate point 46 of a plural resistor voltage divider which, as shown, consists of a resistor 47 extending to the B+ supply line 24, a resistor 48 extending to the negative bias supply line 31, and a resistor 49 extending to ground and to the center tap of the input transformer 21. With this arrangement the potential applied to the grid 42 of control tube 37 will be influenced by any voltage fluctuations in either the plate voltage supply or in the negative bias supply. It follows that any fluctuations in the positive voltage applied to the screen grids 16, 17 of the power amplifier tubes 10 and 11 will be a composite of any hum signal components which may be present in either the grid bias supply or plate supply but in phase opposition therewith. Thus, in the event that any hum is introduced into the power amplifier tubes 10, 11 (as by insufficient filtering capacity in either the B+ or negative bias supply circuits), it will be negatived by an opposing signal simultaneously introduced on the screen grids.

It will also be apparent that since the parameters of the voltage divider resistors may be varied as desired, the circuit may be arranged to maintain the screen grid potentials constant (even with wide fluctuation of the plate current in response to incoming signals) or, alternatively, to cause an increase in the screen grid potential as the current flow in the tubes is increased. Either of these results may be attained by proper selection of values of the resistors 45, 47, 48, and 49 with relation to the operating characteristics of tubes 36 and 37. Thus the voltage applied to the screen grids of the power amplifier tubes can be made to vary with fluctuation in line voltage in a manner to prevent the discharge ratings from the amplifier tubes from being exceeded on the one hand or from reaching a point of cut-off on the other. Also, the desired class of operation can be constantly maintained over a wide range of line voltage fluctuation. The circuit also has the inherent characteristics of protecting the power tubes in the event of failure of the negative bias supply, since failure of the bias supply would eliminate the negative component of the potential applied to the grid 42 of the control tube 37, causing the tube to saturate and acting through the tube 36 to bring the power tubes 10 and 11 to cut-off.

Figure 2:
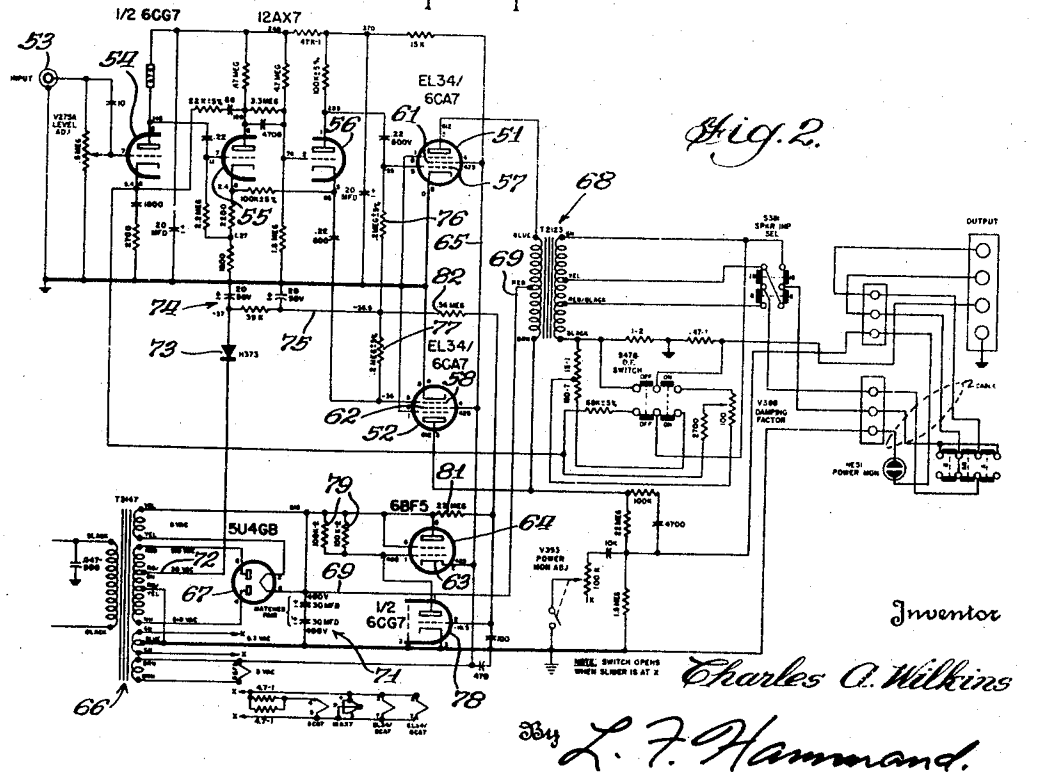
Figure 2 is a schematic diagram of the invention as embodied in a commercial high fidelity amplifier, the circuit diagram including identification of the types of tubes employed, as well as the preferred values of the other circuit components.

The circuit of Figure 2 operates in the same manner as outlined above, although it has been modified in certain respects. In this circuit the push-pull amplifier tubes 51 and 52 are of pentode type, fed from an input source 53 through a circuit which may be conventional and is represented in the diagram by resistance coupled amplifier tubes 54 and 55 with a phase inverter 56 to provide a balanced input to the control grids 57, 58. The cathodes and suppressor grids of both the output tubes may be grounded and the screen grids 61, 62 are directly connected to the cathode 63 of a voltage regulator tube 64 by a screen grid supply line 65. The circuit includes a conventional power input transformer 66 having a split secondary connected to the twin plates of a rectifier tube 67 to provide a full wave rectified B+ supply. This is fed to the center tap of the output transformer primary winding 68 through a B+ supply line 69 and thence to the anodes of the push-pull amplifier tubes 51 and 52, in the conventional manner. A matched pair of condensers 71 serve to filter the B+ supply. The negative bias supply for the tubes 51, 52 is taken from a tap 72 on one side of the center tap of the input transformer secondary and is fed through a half wave rectifier 73 to the filter network 74 and thence to a bias supply lead 75, through resistors 76 and 77, and to the control grids 57 and 58 respectively.

The voltage regulator output tube 64, which is comparable to the tube 36 shown in Figure 1, is also under the control of a tube 78 which functions in the same manner as tube 37 of Figure 1. To this end the cathode of control tube 79 is grounded, and its plate is connected directly to the grid of tube 64. It is also joined to the B+ power supply line 69 through a pair of resistors 79 comparable to the resistor 45 of the Figure 1 circuit. The control grid of tube 78 is again connected to a voltage divider comprising resistors 81 and 82 leading to the B+ power supply line and to the negative grid bias supply line respectively. In this circuit it is unnecessary to utilize a third voltage divider resistor (comparable to the resistor 49) since by proper selection of the values of the resistors 81 and 82 a sample of both the negative bias potential and the positive plate voltage potential may be simultaneously applied to the voltage regulator, so that the regulator is responsive to fluctuations in either or both supplies, and potential applied to the screen grids of the output tubes is controlled accordingly.

Having thus described my invention, what I claim as new and desire to secure by United States Letters Patent is:

1. In a push-pull audio frequency power amplifier circuit, the combination of a pair of power amplifier tubes each including a cathode, an anode, a control grid and at least one screen grid, with a balanced signal input circuit interconnected to the control grids of each of said power amplifier tubes in phase opposition and an output circuit connected to said anodes; a high voltage positive plate supply circuit including an unregulated alternating current source, a power transformer having a primary fed by said alternating current source and a center-tapped secondary, a full wave rectifier in the circuit of said transformer secondary and a filter capacitor thereon, with a positive direct current plate voltage supply lead extending from said rectifier through the output circuit to the anodes of the aforementioned power amplifier tubes; a low voltage negative grid bias circuit including an additional tap on the secondary of the power transformer, a half wave rectifier and a filter capacitor connected thereto, and a bias potential lead extending through a pair of resistors to the control grids of both of the power amplifier tubes; a voltage regulator having a control tube and an output tube each including a cathode, an anode, and a grid, with an output circuit from the output tube of said regulator connected to the aforementioned screen grids of the amplifier tubes, and with an input circuit to said regulator simultaneously responsive to voltage fluctuations in both the bias supply circuit and the plate supply circuit, and connected at an intermediate point in a voltage divider extending between the aforementioned negative grid bias supply circuit and the positive plate supply circuit of the amplifier and comprising at least two resistors in series.

2. In a push-pull audio frequency power amplifier circuit, the combination of a pair of power amplifier tubes each including a cathode, an anode, a control grid and at least one screen grid, with a balanced signal input circuit interconnected to the control grids of each of said power amplifier tubes in phase opposition and an output circuit connected to said anodes; a high voltage positive plate supply circuit including an unregulated alternating current source, a power transformer having a primary fed by said alternating current source and a center-tapped secondary, a full wave rectifier in the circuit of said transformer secondary and a filter capacitor thereon, with a positive direct current plate voltage supply lead extending from said rectifier through the output circuit to the anodes of the aforementioned power amplifier tubes; a low voltage negative grid bias circuit including an additional tap on the secondary of the power transformer, a half wave rectifier and a filter capacitor connected thereto, and a bias potential lead extending through a pair of resistors to the control grids of both of the power amplifier tubes; a voltage regulator having a control tube and an output tube each including a cathode, an anode, and a grid, with an output circuit from the output tube of said regulator connected to the aforementioned screen grids of the amplifier tubes, and with an input circuit to said regulator simultaneously responsive to voltage fluctuations in both the bias supply circuit and plate supply circuit.

3. In an amplifier circuit, the combination of at least one amplifier tube including a cathode, an anode, a control grid and at least one screen grid with a signal input circuit interconnected to the control grid and an output circuit connected to said anode; a high voltage positive plate supply circuit including an unregulated alternating current source, a power transformer having a primary fed by said alternating current source, a rectifier in the circuit of said transformer secondary and a filter capacitor connected across the output of said supply circuit, with a positive direct current plate voltage supply lead extending from said rectifier through said anode circuit to the anode of the aforementioned amplifier tube; a separate low voltage negative grid bias circuit including a filter capacitor connected across the output of said bias circuit, and a bias potential lead extending through a resistor to the control grid of the amplifier tube; a voltage regulator with an output circuit connected to the aforementioned screen grid of the amplifier tube, and with an input circuit connected to said plate voltage supply lead and to said bias potential lead so as to be simultaneously responsive only to direct current voltage fluctuations in both the bias supply circuit and the plate supply circuit.

4. In an amplifier circuit having at least one electron discharge tube including a cathode, an anode, a control grid and a screen grid, with a signal input circuit connected to the control grid and a negative bias supply circuit extending through the signal input circuit to the control grid and including a filter capacitor connected across the output of said bias circuit, an output circuit connected to the anode, and a positive plate voltage supply circuit extending through the output circuit to the anode, and including a filter capacitor connected across the output of said plate supply circuit, the combination of a voltage divider extending between the aforementioned negative grid bias supply circuit and the positive plate voltage supply circuit of the amplifier, and voltage regulator having an output circuit connected to the aforementioned screen grid of the amplifier circuit to supply operating potential thereto, and a control electrode connected to an intermediate point in said voltage divider whereby the screen grid voltage applied to the amplifier tubes will only be simultaneously influenced by direct current voltage variations in both of said supply circuits.

5. In an amplifier circuit having at least one electron discharge tube including a cathode, an anode, a control grid and a screen grid, with a signal input circuit connected to the control grid and a negative bias supply circuit extending to the control grid, an output circuit connected to the anode, and a positive plate voltage supply circuit extending to the anode, the combination of voltage regulator having an output circuit connected to the aforementioned screen grid of the amplifier circuit to supply operating potential thereto, with a control element connected to said grid bias supply circuit and to said plate supply circuit, and means connected to said control element for by-passing the signal from the input and output circuits so that the control element is simultaneously responsive only to direct current voltage fluctuations in both said negative grid bias supply circuit and the positive plate voltage supply circuit of the amplifier.

6. In a push-pull audio frequency power amplifier circuit, the combination of a pair of power amplifier tubes each including a cathode, an anode, a control grid and at least one additional screen grid, with a balanced signal input circuit interconnected to the control grids of each of said power amplifier tubes in phase opposition; an output circuit having the opposite ends of the primary winding of an output transformer directly connected to the anodes of said tubes and a center tap on said winding connected to a high voltage positive plate supply lead; said lead extending to a supply circuit including an unregulated alternating current source, a power transformer having a primary fed by said alternating current source and a center-tapped secondary in series with a rectifier; a low voltage negative grid bias circuit including an additional tap on the secondary of the power transformer, a rectifier and a filter connected thereto, and a negative bias lead extending to the control grids of both of the power amplifier tubes; a voltage regulator having a control tube and an output tube each including a cathode, an anode, and a grid, with the anode of said output tube connected to the positive plate supply lead, the cathode of the output tube connected directly to the aforementioned screen grids of the amplifier tubes, and the grid of said output tube connected to the anode of said control tube; said control tube having its grid connected to an input circuit to said regulator simultaneously responsive to voltage fluctuations in both the bias supply circuit and the plate supply circuit, and connected to the junction of a resistive network having one resistive branch extending to the aforesaid plate supply lead, a second resistive branch extending to the negative bias lead, and a third branch extending to the cathodes of the amplifier tubes and to ground.

References Cited in the file of this patent

UNITED STATES PATENTS

| | | |
|---|---|---|
| 1,927,560 | White | Sept. 19, 1933 |
| 1,969,341 | Wallace | Aug. 7, 1934 |
| 2,217,297 | Siegert | Oct. 8, 1940 |
| 2,232,212 | Cary | Feb. 18, 1941 |
| 2,383,309 | Hathaway | Aug. 21, 1945 |
| 2,480,418 | Paradise et al. | Aug. 30, 1949 |
| 2,777,904 | Milbourne | Jan. 19, 1957 |

FOREIGN PATENTS

| | | |
|---|---|---|
| 808,248 | Germany | July 8, 1949 |